F. F. ELLIS.
DEVICE FOR SETTING ANIMAL TRAPS.
APPLICATION FILED JUNE 13, 1907.
898,731.
Patented Sept. 15, 1908.
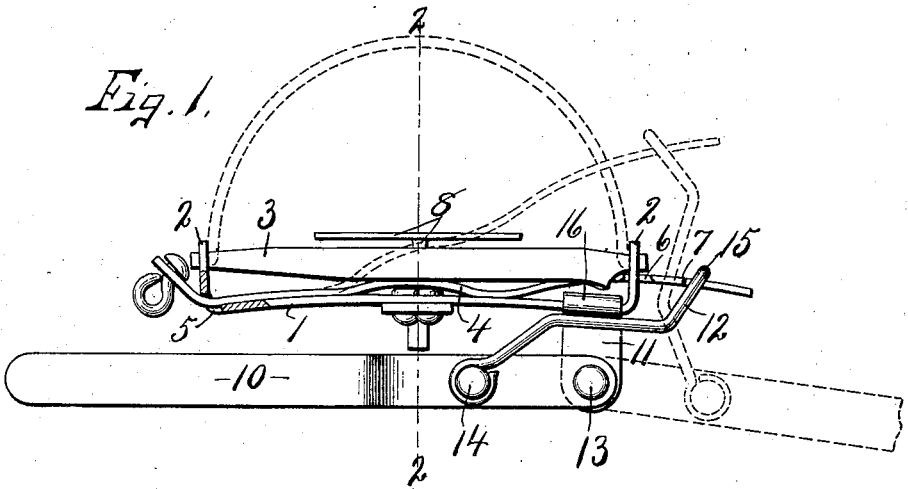
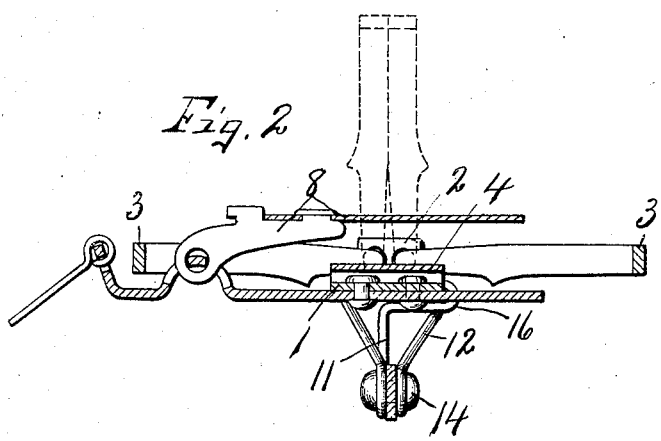
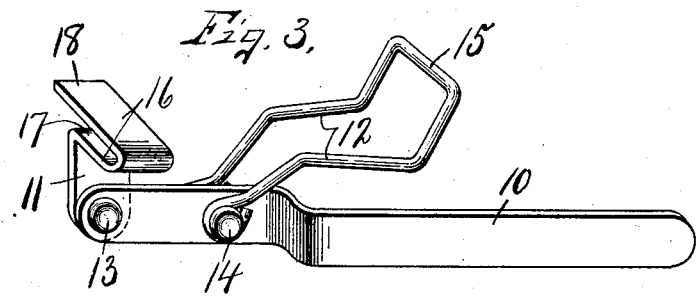
Witnesses.
A. C. Thomas.
H. E. Chase.
Inventor.
F. F. Ellis
By
Howard P. Denison
Attorney.

UNITED STATES PATENT OFFICE.

FERRAND F. ELLIS, OF ONEIDA, NEW YORK, ASSIGNOR TO ONEIDA COMMUNITY, LIMITED, OF KENWOOD, NEW YORK, A CORPORATION OF NEW YORK.

DEVICE FOR SETTING ANIMAL-TRAPS.

No. 898,731.  Specification of Letters Patent.  Patented Sept. 15, 1908.

Application filed June 13, 1907. Serial No. 378,868.

*To all whom it may concern:*

Be it known that I, FERRAND F. ELLIS, of Oneida, in the county of Madison, in the State of New York, have invented new and useful Improvements in Devices for Setting Animal-Traps, of which the following, taken in connection with the accompanying drawings, is a full, clear, and exact description.

This invention relates to a device for setting animal traps of the spring jaw type in which a spring tongue operates when released to automatically close the jaws and is held in its tensioned position with the jaws open by a suitable platform lever and detent.
In this class of traps the spring tongue is usually quite stiff, and it is, therefore, difficult to hold the same against its own tension while setting the trap without more or less liability of getting one's fingers caught in the jaws.

My object, therefore, is to provide a simple, practical and efficient trap setting device which may be easily operated by any person skilled or unskilled in the handling of such traps whereby the spring may be tensioned and held in its tensioned position to permit the jaws to be set and locked in their open position after which the setting device may be readily removed leaving the jaws in their open locked position, in which position one of the jaws operates to hold the spring against its own action.

In the drawings—Figure 1 is a side elevation of an open spring jaw trap showing my improved jaw setting device operatively applied thereto for holding the spring against its own tension, the lever and link being shown by dotted lines in the position assumed when releasing the spring. Fig. 2 is a sectional view of the trap and setting device seen in Fig. 1. Fig. 3 is a perspective view of the detached jaw setting device seen in Fig. 1.

In Fig. 1 I have shown a trap consisting of a spring base bar —1— terminating at its ends in upturned ears —2— in which are pivotally mounted a pair of jaws —3—.

A spring tongue —4— is fulcrumed at one end in the corresponding end of the base bar —1— by reducing the width of the spring —4— and inserting it through an elongated slot —5— in the adjacent end of the base —1—, the opposite end of said spring extending along the upper face of the base bar —1— some distance beyond the opposite ear —2— and is provided with an aperture —6— adapted to receive the adjacent upturned ear —2— and also having its sides adapted to engage and close the jaws —3— when the spring is released.

The free end of the spring tongue —4— is reduced in width forming shoulders —7— and affording means by which the spring may be depressed by hand or otherwise against its own tension in setting the jaws which are held in their open position by one of the jaws and a coacting platform lever —8— and detent —9— of the usual construction, the trap shown being similar to that set forth in my pending application Serial No. 348,784, filed December 20, 1906.

The jaw setting device or more particularly the spring setting device shown in Figs. 1 and 3 consists essentially of a lever —10—, a swinging bracket —11— and a link —12—, the swinging bracket —11— being pivoted at —13— to one end of the lever —10— while the link —12— is pivoted at —14— to said lever at one side of the pivot —13— and preferably consists of an open frame or loop having opposite arms spaced apart and connected at their outer ends by cross bars —15—.

The free end of the bracket —11— terminates in an open loop —16— forming a slot —17— and an over-hanging arm —18— which is adapted to be temporarily interlocked with one end of the base bar —1— when the device is applied to the trap for setting the spring —4—. In tensioning and locking this spring —4— in its tensioned position as shown in Fig. 1, the loop —16— is interlocked with a portion of the base bar —1— preferably near one end adjacent to the free end of the spring tongue —4— in such manner that one side of the base bar —1— is inserted into the slot —17— while the arm —18— over-hangs and engages the opposite face of the bar —1— thereby temporarily supporting the bracket —11— against rocking movement upon the base bar or frame of the trap. When the bracket —11— is thus placed in position, the lever —10— is then rocked to the position shown by dotted lines in Fig. 1 with the link —12— and its pivot —14— wholly at one side of the bracket —11— and pivot —13—, that is at the side to which the free end of the tongue projects and in this position of the lever, the link is rocked so as to bring the cross bar —15— into engagement with the upper face of the reduced extremity of the spring tongue —4—. The pivot —13— then becomes the fulcrum of the lever and by rocking the free end of the lever downwardly and rearwardly under the trap, the link —12— operates to draw the free end of the spring tongue —4— downwardly below the plane of the pintles of the jaw —3— until the link pivot —14— passes to the opposite side or rear of the fulcrum —13— thereby causing the link to automatically and temporarily lock the spring in its tensioned position so that the jaws —3— may be readily opened and locked in their open position by the platform lever —8— and detent —9— and when thus locked, one of the jaws serves to hold the spring tensioned. As soon as this spring is tensioned in the manner just described and locked by means of one of the jaws and its coacting platform lever —8—, and detent —9—, the lever —10— may be rocked forwardly to the reverse position thereby releasing the link —12— from engagement with the free end of the spring —4— and permitting the bracket —11— to be readily removed from interlocking engagement with the base bar —1—, the setting device being then ready for resetting the same or another trap, that is the same setting device may be used in setting any number of traps.

What I claim is:

1. A setting device for animal traps comprising a lever, and means on the lever for engaging and tensioning the spring of the trap and holding the same in its tensioned position.

2. In combination with the jaw operating spring of an animal trap, a lever and fulcrum therefor, a link pivotally connected to the lever and engaging the spring whereby the rocking of the lever on its fulcrum in one direction operates the link to tension the spring.

3. In combination with the jaw operating spring of an animal trap, a lever and fulcrum therefor supported by the trap, and a link connecting the lever to the spring whereby when the lever is rocked in one direction the spring is tensioned.

4. In combination with the jaws, supporting frame and spring tongue of an animal trap, a bracket detachably engaged with the frame, a lever fulcrumed on the bracket and a link pivoted to the lever at one side of its fulcrum and engaged with the spring whereby when the lever is operated in one direction the spring will be tensioned.

5. In combination with an animal trap having a pair of jaws, and a spring for closing the jaws, a spring setting device including a lever and connections between the lever and spring whereby when the lever is rocked in one direction the spring will be tensioned, said spring and connections operating to hold the lever in its operative position.

6. In combination with the jaws and jaw actuating spring of an animal trap, a lever and a fulcrum therefor, supported by the trap, and a link pivoted to the lever at one side of its fulcrum and engaged with said spring whereby when the lever is rocked in one direction, the spring will be tensioned and the pivotal point of the link will be moved to the opposite side of the fulcrum, the spring acting through the link to hold the lever in its operative position for tensioning the spring.

7. A device for the purpose described, comprising a lever provided with means adapting it to be engaged with the base of an animal trap, and a link connected with the lever and adapted to be engaged with a spring of an animal trap, for the purpose set forth.

8. A device for the purpose described, comprising a lever having a hook adapted to be engaged with the base of an animal trap, and a link connected with the lever and adapted to be engaged with a spring of an animal trap, for the purpose set forth.

In witness whereof I have hereunto set my hand this 4th day of June 1907.

FERRAND F. ELLIS.

Witnesses:
A. M. KINSLEY,
M. W. LINDSLEY.